(No Model.)

G. W. GILLESPIE.
ROTARY CUTTER.

No. 437,298. Patented Sept. 30, 1890.

Witnesses:
A. F. Langdon
A. B. Jenkins.

Inventor,
George W. Gillespie, by
Harry R. Williams
Atty.

THE NORRIS PETERS CO., PHOTO-LITHO., WASHINGTON, D. C.

UNITED STATES PATENT OFFICE.

GEORGE W. GILLESPIE, OF HARTFORD, CONNECTICUT.

ROTARY CUTTER.

SPECIFICATION forming part of Letters Patent No. 437,298, dated September 30, 1890.

Application filed November 18, 1889. Serial No. 330,719. (No model.)

*To all whom it may concern:*

Be it known that I, GEORGE W. GILLESPIE, a citizen of the United States, residing at Hartford, in the county of Hartford and State of Connecticut, have invented certain new and useful Improvements in Rotary Cutters, of which the following is a full, clear, and exact specification.

The invention relates to the class of cutters used on machines for grooving and dadoing wood, the object being to provide a simple, efficient, and cheap rotary cutter that can be easily and quickly set, so as to accurately cut grooves or dados of various widths and depths.

To this end the invention consists in a head having a bearing for an arbor and seats on different planes supporting radially-projecting blades, as more particularly hereinafter described, and pointed out in the claims.

Figure 1:
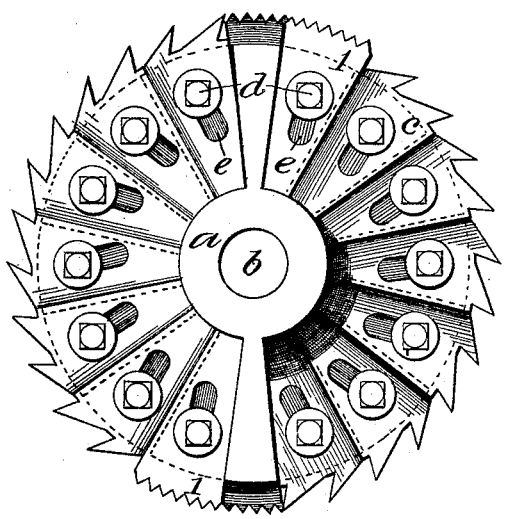
Figure 2:
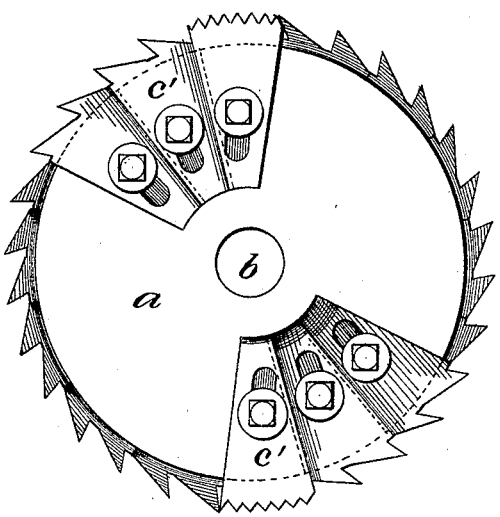
Figure 3:
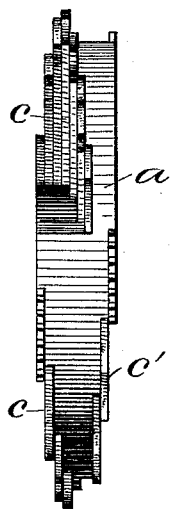
Figure 6:
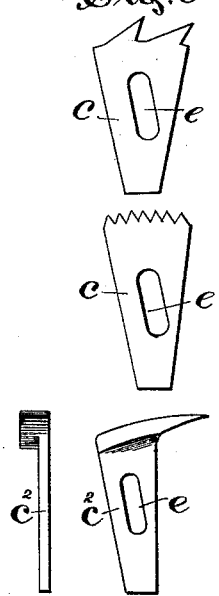
Figures 4, 5:
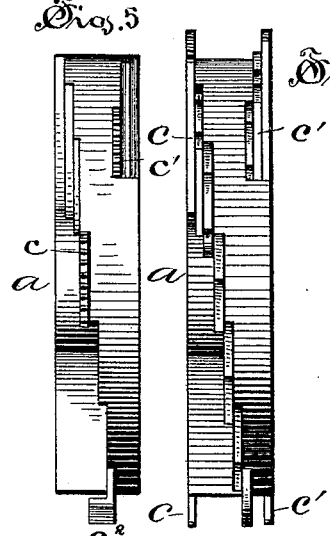

Referring to the accompanying drawings, Figure 1 is a view of one face of the cutter. Fig. 2 is a view of the opposite face. Fig. 3 is an edge view as seen from above Fig. 1, the blade-clamping bolts being omitted. Fig. 4 is a view of the edge with the cutter rotated a quarter of a revolution from the position occupied in Fig. 3. Fig. 5 is a similar edge view, showing a different arrangement of blades. Fig. 6 are detail views of the interchangeable blades.

In the views, the letter $a$ denotes the head, which is formed from a circular plate of metal, as iron or steel, of the desired thickness, with a central perforation $b$ to receive the arbor upon which it is to be mounted. On one side of the head a number of segmental faces are formed on different planes, preferably beginning at the surface, each succeeding segmental face being cut deeper by the thickness of the blades to be used for about one-half the distance around the head, then again commencing at the surface and descending in steps, as before, so that the diametrically-opposite segmental faces only are in the same plane. The blades $c$, provided with any desirable form of teeth, are clamped by screw-bolts $d$ to these faces, with their back edge against the front edge of the raised face next behind and their cutting-teeth projecting some distance beyond the periphery of the head. The bolts $d$ preferably pass through slots $e$ in the blades, so the blades may have radial adjustment, and the body of the blades is preferably a little wider than the seats, so as to overlap the back edge of the next lower blade and aid in keeping it in place.

In cutting away the segmental seat-faces enough metal must be left in the body at that part in which to form a threaded socket, so that the clamping-bolts will firmly hold the blades in place, and to utilize the entire thickness of the head additional faces in steps may be cut on the opposite side in planes not occupied by the faces on the side already described, and to these faces are clamped blades $c'$, so that if blades are set on all of the seat-faces on both sides of the head the cutter will cut a kerf as wide as the thickness of the head. If it is desired to cut a groove of still greater width, a plate may be attached to the head in place of the blade on the highest seat, and a blade bolted on top of the plate.

In using the cutter, if it is desired to cut a groove or dado of but the width of the thickness of a single blade two blades are clamped to the head on seats lying in the same plane as blades $l\ l$, and if a wider groove is to be cut other blades may be secured to the different steps until the combined thickness of the blades equals the width of the groove to be cut.

In order to reduce the number of blades and obviate the necessity of setting and adjusting a large number, blades $c''$, having chisel-edge teeth of different widths, may be provided, so that one blade will cut a wide groove, and these may be combined with the thinner blades, so as to produce a cut of the required width with fewer blades.

If a groove is to be cut in a piece of wood in the direction of the grain, all of the blades which are used may have coarse teeth; but for dado-work across the grain it is preferable that the outside blades have fine teeth, so as to make a cut with a clean edge, while the intermediate blades may have coarse teeth to tear away what the outside teeth have marked. Blades in certain planes may project farther than the others to make a deeper cut in some lines, or some of the blades may be removed, so as to leave a ridge between two grooves, according to the design.

This cutter can be quickly set to cut grooves and dados of various widths and depths. Each blade is backed up in the direction of the strain by the metal of the head and cannot get out of place and spring, and the cutters are so distributed around the head that there is always the same strain upon the machine. Consequently the work is done rapidly with less vibration and rattle than is common with machines using the prior groovers and dadoers.

I claim as my invention—

1. A rotary cutter consisting of a head, one side of which is formed into a plural number of spirally-arranged segmental faces, and radial blades clamped upon said faces, so as to project from the periphery of the head in a spiral line, substantially as specified.

2. A rotary cutter consisting of a head having its sides formed into a plural number of spirally-arranged segmental faces, and radial blades clamped upon said faces, so as to project from the periphery of the head in spiral lines, substantially as specified.

GEORGE W. GILLESPIE.

Witnesses:
HARRY R. WILLIAMS,
H. E. BACHARACH.